US011911841B2

(12) United States Patent
Miyake et al.

(10) Patent No.: US 11,911,841 B2
(45) Date of Patent: Feb. 27, 2024

(54) DOUBLE-ACTING FRICTION STIR SPOT WELDING APPARATUS AND METHOD OF OPERATING DOUBLE-ACTING FRICTION STIR SPOT WELDING APPARATUS

(71) Applicant: Kawasaki Jukogyo Kabushiki Kaisha, Kobe (JP)

(72) Inventors: Masahiro Miyake, Kobe (JP); Syuhei Yoshikawa, Kobe (JP); Yusuke Yoshida, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/762,733

(22) PCT Filed: Sep. 15, 2020

(86) PCT No.: PCT/JP2020/034973
§ 371 (c)(1),
(2) Date: Mar. 23, 2022

(87) PCT Pub. No.: WO2021/060086
PCT Pub. Date: Apr. 1, 2021

(65) Prior Publication Data
US 2022/0339734 A1    Oct. 27, 2022

(30) Foreign Application Priority Data
Sep. 27, 2019    (JP) .................... 2019-177610

(51) Int. Cl.
*B23K 20/00*    (2006.01)
*B23K 20/12*    (2006.01)

(52) U.S. Cl.
CPC ........ *B23K 20/125* (2013.01); *B23K 20/1255* (2013.01)

(58) Field of Classification Search
CPC ............. B23K 20/1255; B23K 20/125; B23K 20/122; B23K 20/126; B23K 20/26;
(Continued)

(56) References Cited

U.S. PATENT DOCUMENTS 689,516 A * 12/1901 Rattek .................. E21B 19/086
173/132
4,591,300 A * 5/1986 Weiblen ................. B23B 41/02
227/27
(Continued)

FOREIGN PATENT DOCUMENTS

JP    11-320128 A    11/1999
JP    2002-346770 A    12/2002
(Continued)

*Primary Examiner* — Erin B Saad
(74) *Attorney, Agent, or Firm* — XSENSUS LLP

(57) ABSTRACT

A double-acting friction stir spot welding apparatus according to the present disclosure includes a pin member (11) formed in a cylindrical shape, a shoulder member (12) formed in a hollow cylindrical shape and into which the pin member (11) is inserted, a rotary drive (57) that rotates the pin member (11) and the shoulder member (12) on an axis (Xr) coaxial with the pin member (11), and a linear drive (53) that reciprocates each of the pin member (11) and the shoulder member (12) along the axis (Xr). Oil solution (70) is disposed at at least one circumferential surface among an outer circumferential surface (11*c*) of the pin member (11), an inner circumferential surface (12*b*) of the shoulder member (12), an outer circumferential surface (12*c*) of the shoulder member (12), and an inner circumferential surface (13*b*) of a clamp member (13).

11 Claims, 13 Drawing Sheets

(58) Field of Classification Search
CPC .. B23K 20/12; B23K 20/123; B23K 20/1245; B23K 20/1265; B23K 20/129; B23K 2101/04; B23K 2101/18; B23K 2103/10; B23K 9/328
See application file for complete search history.

(56) References Cited

U.S. PATENT DOCUMENTS

| | | | | |
|---|---|---|---|---|
| 6,138,895 | A * | 10/2000 | Oelgoetz | B23K 20/125 228/2.1 |
| 7,677,427 | B2 * | 3/2010 | Fukuhara | B23K 20/125 228/2.1 |
| 10,022,817 | B2 * | 7/2018 | Maruko | B23K 20/1255 |
| 2005/0092817 | A1 * | 5/2005 | Baumann | B25B 5/00 228/212 |
| 2008/0217377 | A1 * | 9/2008 | Stol | B23K 20/1255 228/2.3 |
| 2014/0029882 | A1 * | 1/2014 | Palmer | F16C 33/6685 384/473 |
| 2014/0217151 | A1 * | 8/2014 | Miyahara | B23K 20/12 228/2.1 |
| 2015/0183054 | A1 | 7/2015 | Okada | |
| 2021/0086291 | A1 | 3/2021 | Okada et al. | |
| 2021/0316391 | A1 * | 10/2021 | Miyake | B23K 20/26 |

FOREIGN PATENT DOCUMENTS

| | | | | |
|---|---|---|---|---|
| JP | 2005-305486 A | 11/2005 | | |
| JP | 2005-319484 A | 11/2005 | | |
| JP | 2007-29979 A | 2/2007 | | |
| KR | 101833294 B1 * | 3/2018 | ........ | B23K 20/122 |
| WO | 2014/024474 A1 | 2/2014 | | |
| WO | 2019/045102 A1 | 3/2019 | | |

* cited by examiner

DOUBLE-ACTING FRICTION STIR SPOT WELDING APPARATUS AND METHOD OF OPERATING DOUBLE-ACTING FRICTION STIR SPOT WELDING APPARATUS

CROSS-REFERENCE TO RELATED APPLICATIONS

The present application is based on PCT filing PCT/JP2020/034973, filed Sep. 15, 2020, which claims priority to JP 2019-177610, filed Sep. 27, 2019, the entire contents of each are incorporated herein by reference.

TECHNICAL FIELD

The present disclosure relates to a double-acting friction stir spot welding apparatus and a method of operating the double-acting friction stir spot welding apparatus.

BACKGROUND ART

It is known that a double-acting rotary tool for a friction stir spot welding, which discharges outside material entered into a gap between a probe and a shoulder member, and keeps the material from agglutinating the gap (for example, see Patent Document 1).

In the double-acting rotary tool for the friction stir spot welding disclosed in Patent Document 1, a stepped part between a tip-end part and a base part of the probe constitutes an agglutination prevention/elimination measure. After a friction stir spot welding operation, the probe is projected relatively to the shoulder member to discharge the entered material outside.

REFERENCE DOCUMENT OF CONVENTIONAL ART

Patent Document

[Patent Document 1] JP2007-029979A

DESCRIPTION OF THE DISCLOSURE

Problem(s) to be Solved by the Disclosure

However, even in the double-acting rotary tool for the friction stir spot welding disclosed in Patent Document 1, a gap is formed between an outer circumferential surface of the stepped part and an inner circumferential surface of the shoulder member. For this reason, when the material enters into this gap, the entered material cannot be discharged outside by the stepped part. Further, at the stepped part, it is difficult to discharge the material agglutinated to the surface, such as the outer circumferential surface of the probe and/or the inner circumferential surface of the shoulder member.

The present disclosure is made in view of solving the above-described conventional problems, and one purpose thereof is to provide a double-acting friction stir spot welding apparatus and a method of operating the double-acting friction stir spot welding apparatus, which can suppress agglutination of material originated from an object to be joined to at least one circumferential surface among an outer circumferential surface of a pin member (probe), an inner circumferential surface of a shoulder member, an outer circumferential surface of the shoulder member, and an inner circumferential surface of a clamp member, compared with conventional double-acting friction stir spot welding apparatuses.

Means for Solving the Problem(s)

In order to solve the problem, a double-acting friction stir spot welding apparatus according to the present disclosure includes a pin member formed in a cylindrical shape, a shoulder member formed in a hollow cylindrical shape and into which the pin member is inserted, a clamp member formed in a hollow cylindrical shape and into which the shoulder member is inserted, a rotary drive that rotates the pin member and the shoulder member on an axis coaxial with the pin member, and a linear drive that reciprocates each of the pin member and the shoulder member along the axis. Oil solution is disposed at at least one circumferential surface among an outer circumferential surface of the pin member, an inner circumferential surface of the shoulder member, an outer circumferential surface of the shoulder member, and an inner circumferential surface of the clamp member.

According to this, since an oil film is formed on at least one circumferential surface among the outer circumferential surface of the pin member, the inner circumferential surface of the shoulder member, the outer circumferential surface of the shoulder member, and the inner circumferential surface of the clamp member, the agglutination of the material originated from an object to be joined to the circumferential surface is suppressed as compared with conventional friction stir spot welding apparatuses.

Furthermore, a method of operating a friction stir spot welding apparatus according to the present disclosure is a method of operating a double-acting friction stir spot welding apparatus, and the double-acting friction stir spot welding apparatus includes a pin member formed in a cylindrical shape, a shoulder member formed in a hollow cylindrical shape and into which the pin member is inserted, a clamp member formed in a hollow cylindrical shape and into which the shoulder member is inserted, a rotary drive that rotates the pin member and the shoulder member on an axis coaxial with the pin member, and a linear drive that reciprocates each of the pin member and the shoulder member along the axis. The method includes (A) supplying oil solution to at least one circumferential surface among an outer circumferential surface of the pin member, an inner circumferential surface of the shoulder member, an outer circumferential surface of the shoulder member, and an inner circumferential surface of the clamp member.

According to this, since the oil film is formed on at least one circumferential surface among the outer circumferential surface of the pin member, the inner circumferential surface of the shoulder member, the outer circumferential surface of the shoulder member, and the inner circumferential surface of the clamp member, the agglutination of the material originated tram the object to be joined to the circumferential surface is suppressed as compared with conventional friction stir spot welding apparatuses.

The above purpose, other purposes, features, and advantages of the present disclosure will be made clear from the following detailed description of suitable embodiments with reference to the accompanying drawings.

Effect of the Disclosure

According to the friction stir spot welding apparatus and the method of operating the double-acting friction stir spot welding apparatus of the present disclosure, the agglutination of the material originated from the object to be joined to the circumferential surface is suppressed as compared with conventional friction stir spot welding apparatuses.

MODES FOR CARRYING OUT THE DISCLOSURE

Figure 1:
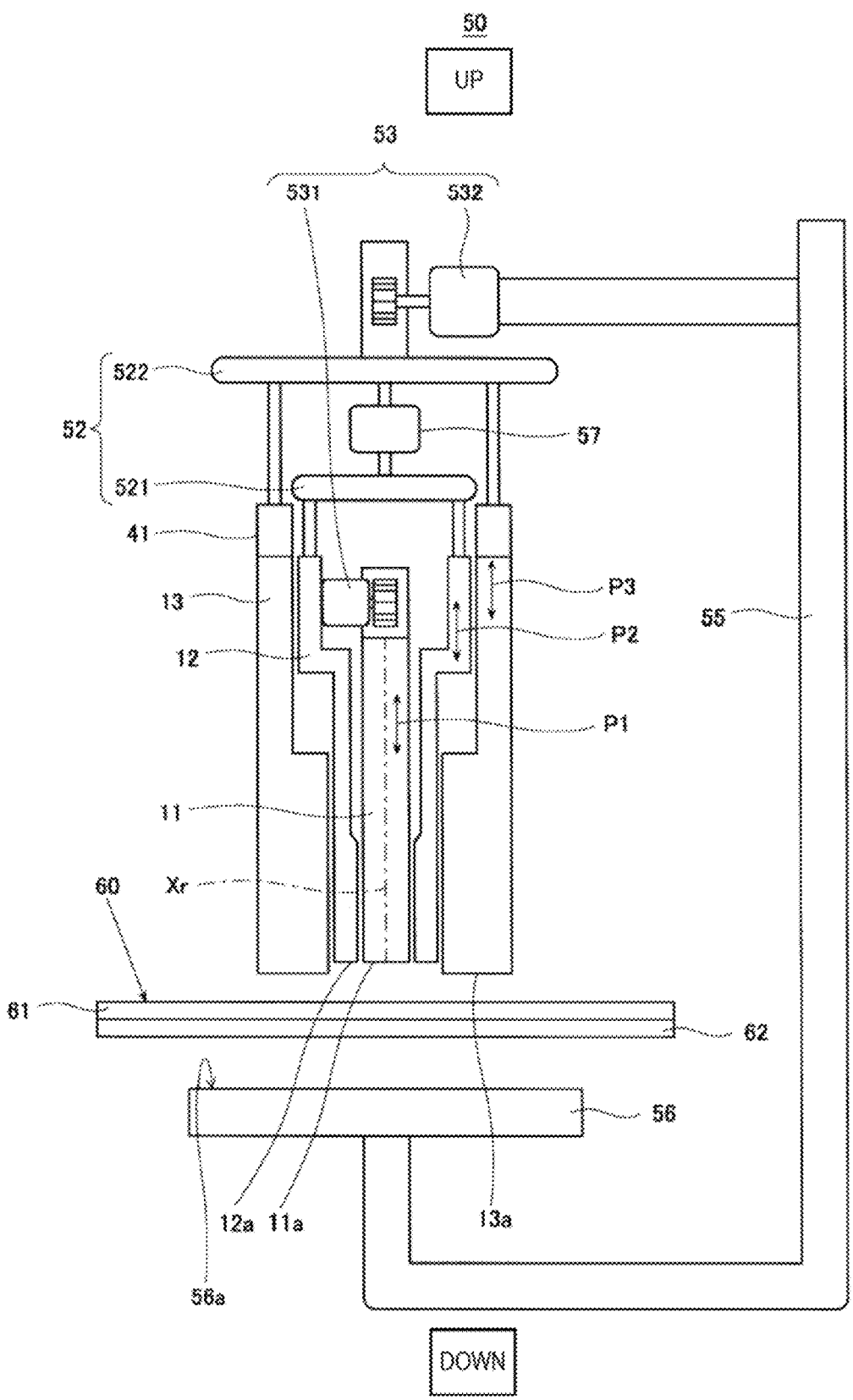
FIG. 1 is a schematic diagram illustrating an outline configuration of a friction stir spot welding apparatus according to Embodiment 1.

Hereinafter, desirable embodiments of the present disclosure will be described with reference to the drawings. Note that, below, throughout the drawings, the same reference characters are assigned to the same or corresponding elements to omit redundant explanation. Further, throughout the drawings, components necessary to explain the present disclosure are selectively illustrated, and illustration of other components may be omitted. Moreover, the present disclosure is not limited to the following embodiments.

Embodiment 1

A double-acting friction stir spot welding apparatus according to Embodiment 1 includes a pin member which is formed in a cylindrical shape, a shoulder member which is formed in a hollow cylindrical shape and into which the pin member is inserted, a clamp member which is formed in a hollow cylindrical shape and into which the shoulder member is inserted, a rotary drive which rotates the pin member and the shoulder member on an axis coaxial with the pin member, and a linear drive which reciprocates each of the pin member and the shoulder member along the axis. Oil solution is disposed at at least one circumferential surface among an outer circumferential surface of the pin member, an inner circumferential surface of the shoulder member, an outer circumferential surface of the shoulder member, and an inner circumferential surface of the clamp member.

In the double-acting friction stir spot welding apparatus according to Embodiment 1, the oil solution may be liquid or semisolid.

In a method of operating a double-acting friction stir spot welding apparatus according to Embodiment 1, the double-acting friction stir spot welding apparatus includes a pin member which is formed in a cylindrical shape, a shoulder member which is formed in a hollow cylindrical shape and into which the pin member is inserted, a clamp member which is formed in a hollow cylindrical shape and into which the shoulder member is inserted, a rotary drive which rotates the pin member and the shoulder member on an axis coaxial with the pin member, and a linear drive which reciprocates each of the pin member and the shoulder member along the axis. The method includes (A) supplying oil solution to at least one circumferential surface among an outer circumferential surface of the pin member, an inner circumferential surface of the shoulder member, an outer circumferential surface of the shoulder member, and an inner circumferential surface of the clamp member.

In this case, the supplying oil solution may be performed by a manual operation by a worker or may be performed by an oil solution feed mechanism as described later.

In the method of operating the double-acting friction stir spot welding apparatus according to Embodiment 1, in the (A), the oil solution may be supplied to the circumferential surface by the oil solution feed mechanism, before performing a friction stir spot welding operation, and/or after performing the friction stir spot Welding operation.

Hereinafter, one example of the friction stir spot welding apparatus according to Embodiment 1 is described in detail with reference to the drawings.

Configuration of Friction Stir Spot Welding Apparatus

Figure 2:
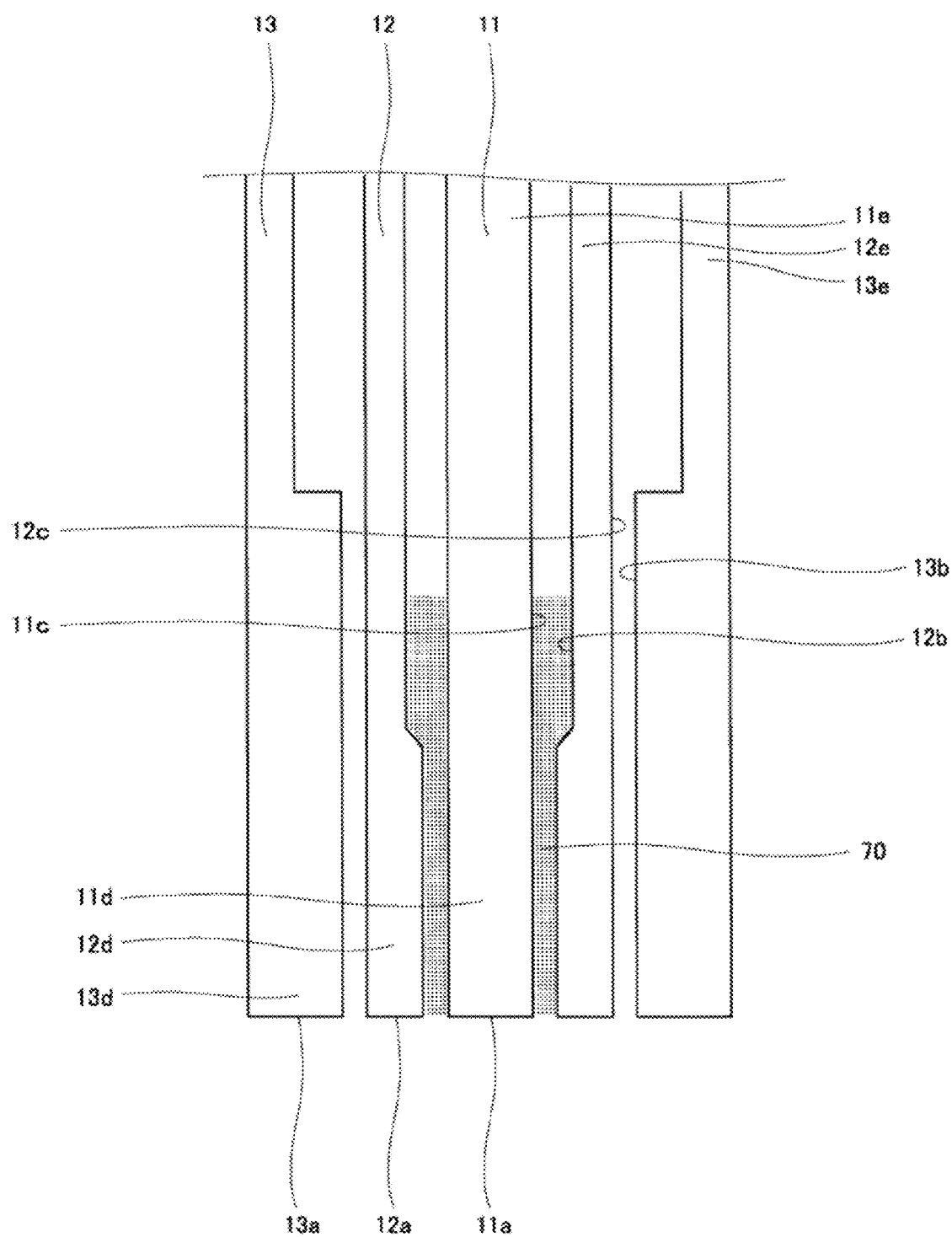
FIG. 2 is a schematic diagram where a substantial part of the friction stir spot welding apparatus illustrated in FIG. 1 is enlarged.
Figure 3:
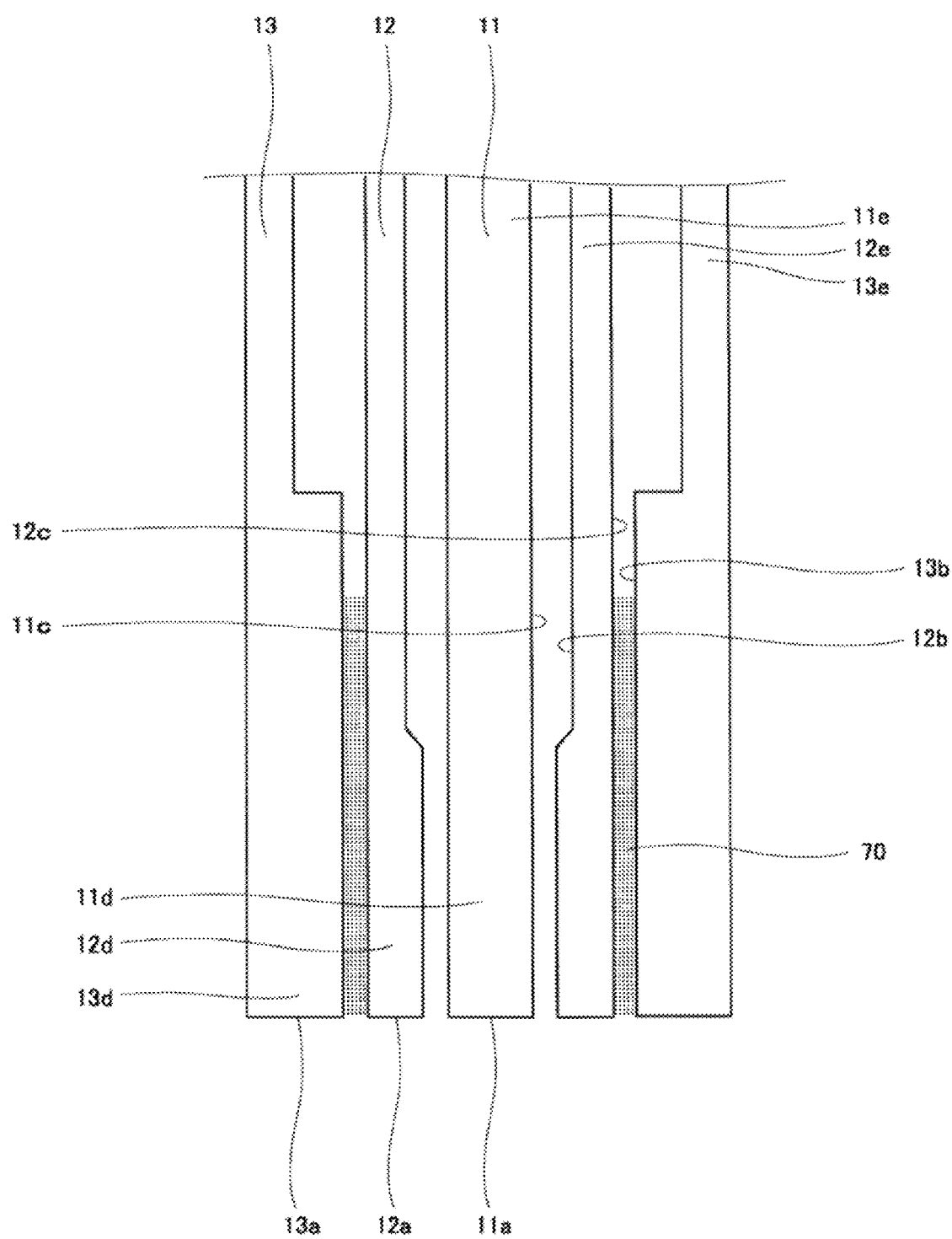
FIG. 3 is a schematic diagram where the substantial part of the friction stir spot welding apparatus illustrated in FIG. 1 is enlarged.
Figure 4:
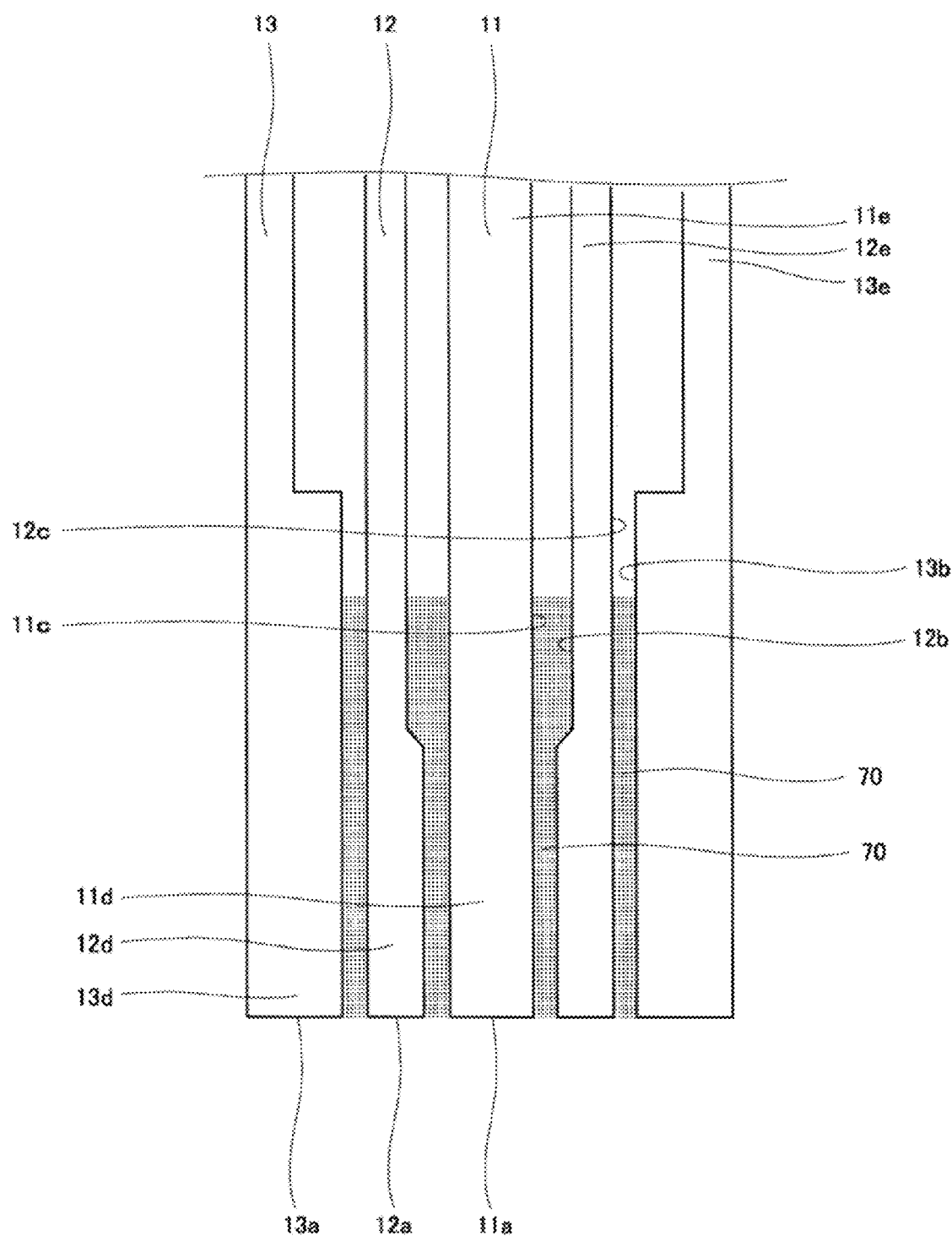
FIG. 4 is a schematic diagram where the substantial part of the friction stir spot welding apparatus illustrated in FIG. 1 is enlarged.

FIG. 1 is a schematic diagram illustrating an outline configuration of a friction stir spot welding apparatus according to Embodiment 1. FIGS. 2 to 4 are schematic diagrams where a substantial part of the friction stir spot welding apparatus illustrated in FIG. 1 is enlarged. Note that, in FIG. 1, an up-and-down direction of the drawings is expressed as an up-and-down direction of the friction stir spot welding apparatus.

As illustrated in FIG. 1, the friction stir spot welding apparatus 50 according to Embodiment 1 includes a pin member 11, a shoulder member 12, a tool fixator 52, a linear drive 53, a clamp member 13, a backing support 55, a backing member 56, and a rotary drive 57.

The pin member 11, the shoulder member 12, the tool fixator 52, the linear drive 53, the clamp member 13, and the rotary drive 57 are provided to an upper end part of the backing support 55 which is comprised of a C-shaped gun (C-shaped frame). Further, the backing member 56 is provided to a lower end part of the backing support 55. The pin member 11, the shoulder member 12 and the clamp member 13, and the backing member 56 are attached to the backing support 55 at mutually opposite positions. Note that an object 60 to be joined (to-be-joined object) is disposed between the pin member 11, the shoulder member 12 and the clamp member 13, and the backing member 56.

The to-be-joined object 60 has two plate-like first member 61 and second member 62. The first member 61 and the second member 62 may be made of metal (for example, aluminum or steel), or fiber-reinforced plastic (for example, carbon fiber reinforced plastic).

Note that, although in Embodiment 1 the to-be-joined object 60 is comprised of the plate-like first member 61 and second member 62, it is not limited to this configuration, but the shape of the to-be-joined object 60 (the first member 61 and the second member 62) is arbitrary. For example, it may be a rectangular parallelepiped shape or may be an arc shape. Further, the to-be-joined object 60 may be comprised of three or more members.

The pin member 11, the shoulder member 12, and the clamp member 13 are fixed to the tool fixator 52 which is comprised of a rotary tool fixator 521 and a clamp fixator 522. In detail, the pin member 11 and the shoulder member 12 are fixed to the rotary tool fixator 521, and the clamp member 13 is fixed to the clamp fixator 522 via a clamp drive 41. The rotary tool fixator 521 is supported by the clamp fixator 522 is the rotary drive 57. Note that the clamp drive 41 is comprised of a spring.

The pin member 11, the shoulder member 12, and the clamp member 13 are linearly driven in the up-and-down direction by the linear drive 53 which is comprised of a pin drive 531 and a shoulder drive 532. Note that, below, at least one member among the pin member 11, the shoulder member 12, and the clamp member 13 may be referred to as "the tool."

The pin member 11 is formed in a cylindrical shape, and although not illustrated in detail in FIG. 1, it is supported by the rotary tool fixator 521. Moreover, the pin member 11 is rotated by the rotary drive 57 on an axis Xr (rotation axis) coaxial with the pin member 11, and is linearly movable by the pin drive 531 in an arrow P1 direction, i.e., an axis Xr direction (the up-and-down direction in FIG. 1). The pin drive 531 may have a configuration of giving a pressing force to the pin member 11, and a mechanism using gas pressure, oil pressure, and a servo motor may be conveniently used, for example.

The shoulder member 12 is formed in a hollow cylindrical shape, and is supported by the rotary tool fixator 521. The pin member 11 is inserted into the hollow of the shoulder member 12. In other words, the shoulder member 12 is disposed so that it surrounds an outer circumferential surface of the pin member 11.

Moreover, the shoulder member 12 is rotated by the rotary drive 57 on the axis Xr which is coaxial with the pin member 11, and is linearly movable by the shoulder drive 532 in an arrow P2 direction, i.e., an axis Xr direction. The shoulder drive 532 may have any configuration as long as it gives a pressing force to the shoulder member 12, and a mechanism using gas pressure, oil pressure, and a servo motor can be conveniently used, for example.

In this embodiment, the pin member 11 and the shoulder member 12 are supported by the same rotary tool fixator 521, and are integrally rotated on the axis Xr by the rotary drive 57. Furthermore, the pin member 11 and the shoulder member 12 are linearly movable in the axis Xr direction by the pin drive 531 and the shoulder drive 532, respectively.

Note that although in Embodiment 1 the pin member 11 is linearly movable independently and is linearly movable in association with the linear movement of the shoulder member 12, each of the pin member 11 and the shoulder member 12 may be linearly movable independently.

The clamp member 13 is formed in a hollow cylindrical shape similarly to the shoulder member 12, and it is provided so that its axial center is in agreement with the axis Xr. The shoulder member 12 is inserted into the hollow of the clamp member 13.

That is, the cylindrical shoulder member 12 is disposed so that it surrounds the outer circumferential surface of the pin member 11, and the cylindrical clamp member 13 is disposed so that it surrounds the outer circumferential surface of the shoulder member 12, In other words, the clamp member 13, the shoulder member 12, and the pin member 11 have a coaxial telescopic structure.

Further, the clamp member 13 is constructed so that it presses the to-be-joined object 60 from one surface (upper surface). In Embodiment 1, the clamp member 13 is supported by the clamp fixator 522 via the clamp drive 41, as described above. The clamp drive 41 is constructed so that it biases the clamp member 13 toward the backing member 56. The clamp member 13 (including the clamp drive 41 and the clamp fixator 522) is linearly movable by the shoulder drive 532 in an arrow P3 direction (the same direction as the arrow P1 and the arrow P2).

Note that, in Embodiment 1, although the clamp drive 41 is comprised of the spring, it is not limited to this configuration. The clamp drive 41 may have any configuration as long as it gives the biasing force or the pressing force to the clamp member 13, and a mechanism using gas pressure, oil pressure, and a servo motor may also be conveniently used, for example.

The pin member 11, the shoulder member 12, and the clamp member 13 are each provided with a tip-end face 11a, a tip-end face 12a, and a tip-end face 13a. Further, the pin member 11, the shoulder member 12, and the clamp member 13 are linearly moved by the linear drive 53 so that the tip-end face 11a, the tip-end face 12a, and the tip-end face 13a contact the upper surface of the to-be-joined object 60 (a to-be-joined part of the to-be-joined object 60) and press the to-be-joined object 60, respectively.

As illustrated in FIGS. 2 to 4, in the friction stir spot welding apparatus 50 according to Embodiment 1, oil solution 70 is disposed at (applied to at least one circumferential surface among an outer circumferential surface 11c of the pin member 11, an inner circumferential surface 12b of the shoulder member 12, an outer circumferential surface 12c of the shoulder member 12, and an inner circumferential surface 13b of the clamp member 13.

Note that, although in the friction stir spot welding apparatus 50 illustrated in FIGS. 2 and 4 the oil solution 70 is disposed at both the circumferential surfaces of the outer circumferential surface 11c of the pin member 11 and the inner circumferential surface 12b of the shoulder member 12, the oil solution 70 may be disposed at any one of the circumferential surfaces. Similarly, although in the friction stir spot welding apparatus 50 illustrated in FIGS. 3 and 4 the oil solution 70 is disposed at both the circumferential surfaces of the outer circumferential surface 12c of the shoulder member 12 and the inner circumferential surface 13b of the clamp member 13, the oil solution 70 may be disposed at any one of the circumferential surfaces.

In terms of disposing the oil solution 70 at the circumferential surface of the tip-end part of the tool where the agglutination of the material originated from the to-be-joined object 60 happens easily, it may be disposed at the circumferential surface of at least one tip-end part among a tip-end part 11d of the pin member 11, a tip-end part 12d of the shoulder member 12, and a tip-end part 13d of the clamp member 13.

Further, in terms of supplying the oil solution 70 to the circumferential surface of the tip-end part of the tool, it may be disposed at the circumferential surface of at least one base-end part among a base-end part 11e of the pin member 11, a base-end part 12e of the shoulder member 12, and a base-end part 13e of the clamp member 13.

Here, the tip-end part of the tool may be a part of the tool from a tip-end face to a ½ or less of the length of the tool in the axis Xr direction. Further, the base-end part of the tool may be a part of the tool from the base-end face of the tool to a ½ or less of the length of the tool in the axis Xr direction.

Further, in terms of suppressing the agglutination of the material originated from the to-be-joined object 60 to the tip-end face of the tool, the oil solution 70 may be disposed at any one of the tip-end face 11a of the pin member 11, the tip-end face 12a of the shoulder member 12, and the tip-end face 13a of the clamp member 13. Especially, since the agglutination of the material originated from the to-be-joined object 60 can be suppressed if the oil solution 70 is disposed at the tip-end face 11a of the pin member 11 and the tip-end face 12a of the shoulder member 12, the surface of the joining part can be more smoothened.

Note that, when the oil solution 70 is disposed at any one of the tip-end face 11a of the pin member the tip-end face 12a of the shoulder member 12, and the tip-end face 13a of the clamp member 13 the oil solution 70 may not be disposed at the circumferential surface of the tool.

The oil solution 70 may be made of liquid or semi-solid (grease) oil solution. The ail solution 70 may be made of oil solution having high-temperature heat resistance. As the oil solution 70, Hightemp Oil G (brand name), SUMIKO SN-B Grease (brand name), or Moly Paste S (brand name) may be used, for example.

Note that the oil solution 70 may be disposed (applied) by an worker at the circumferential surface of the tool. Alternatively, the oil solution 70 may be soaked into cloth or may be adhered to a brush, and the cloth or the brush may then be held by a robot, and the robot may dispose (apply) the oil solution at (to) the circumferential surface of the tool. Alternatively, the oil solution 70 may be disposed at (applied to) the circumferential surface of the tool by fixing a brush, a swab, etc. to which the oil solution 70 is adhered to a pedestal, and moving the robot holding the friction stir spot welding apparatus 50.

Alternatively, before performing a friction stir spot welding operation, the oil solution 70 may be disposed at (applied to) the circumferential surface of the tool, and/or after performing the friction stir spot welding operation, it may be disposed at (applied to) the circumferential surface of the tool.

In Embodiment 1, the backing member 56 contacts to support a lower surface of the plate-like to-be-joined object 60 by its flat surface (support surface 56a). The backing member 56 is not particularly limited in the configuration, as long as it is capable of appropriately supporting the to-be-joined object 60 so that the friction stir spot welding can be performed. As for the backing member 56, for example, backing members 56 having plural kinds of shapes may be prepared separately, and one of the backing members 56 may be removed from the backing support 55 and replaced to another backing member 56 according to the kind of the to-be-joined object 60.

Note that, in Embodiment 1, the concrete configurations of the pin member 11, the shoulder member 12, the tool fixator 52, the linear drive 53, the clamp member 13, the backing support 55, and the rotary drive 57 are not limited to the configurations described above, but those configurations which are widely known in the field of the friction stir welding may be conveniently used. For example, the pin drive 531 and the shoulder drive 532 may be comprised of a motor, a gear mechanism, etc. known in the field of the friction stir welding.

Further, although in Embodiment 1 the backing support 55 is comprised of the C-shaped gun, it is not limited to this configuration. The backing support 55 may be configured arbitrary as long as it is capable of supporting the pin member 11, the shoulder member 12, and the clamp member 13 linearly movable, and is capable of supporting the backing member 56 at a position where it opposes to the pin member 11, the shoulder member 12, and the clamp member 13.

Further, the friction stir spot welding apparatus 50 according to Embodiment 1 is disposed at a robot device for the friction stir spot welding (not illustrated). In detail, the backing support 55 is attached to a tip end of an arm of the robot device. For this reason, the backing support 55 can be considered to be included in the robot device for the friction stir spot welding. Including the backing support 55 and the arm, the concrete configuration of the robot device for the friction stir spot welding is not limited in particular, but known configurations in the field of the friction stir welding such as an articulated robot, can be used conveniently.

Note that the friction stir spot welding apparatus 50 (including the backing support 55) is not limited to the case where it is applied to the robot device for the friction stir spot welding, but it can also be applied suitably to known machining apparatuses, such as a NC machine, a large-sized C-frame, and an auto riveter.

Further, in the friction stir spot welding apparatus 50 according to Embodiment 1, two or more pairs of robots may be configured so that a part of the friction stir spot welding apparatus 50 other than the backing member 56 opposes the backing member 56. Further, in the friction stir spot welding apparatus 50, as long as it is capable of stably performing the friction stir spot welding of the to-be-joined object 60, the to-be-joined object 60 may be a hand-held type, or a robot may be a positioner of the to-be-joined object 60.

Control Configuration of Friction Stir Spot Welding Apparatus

Figure 5:
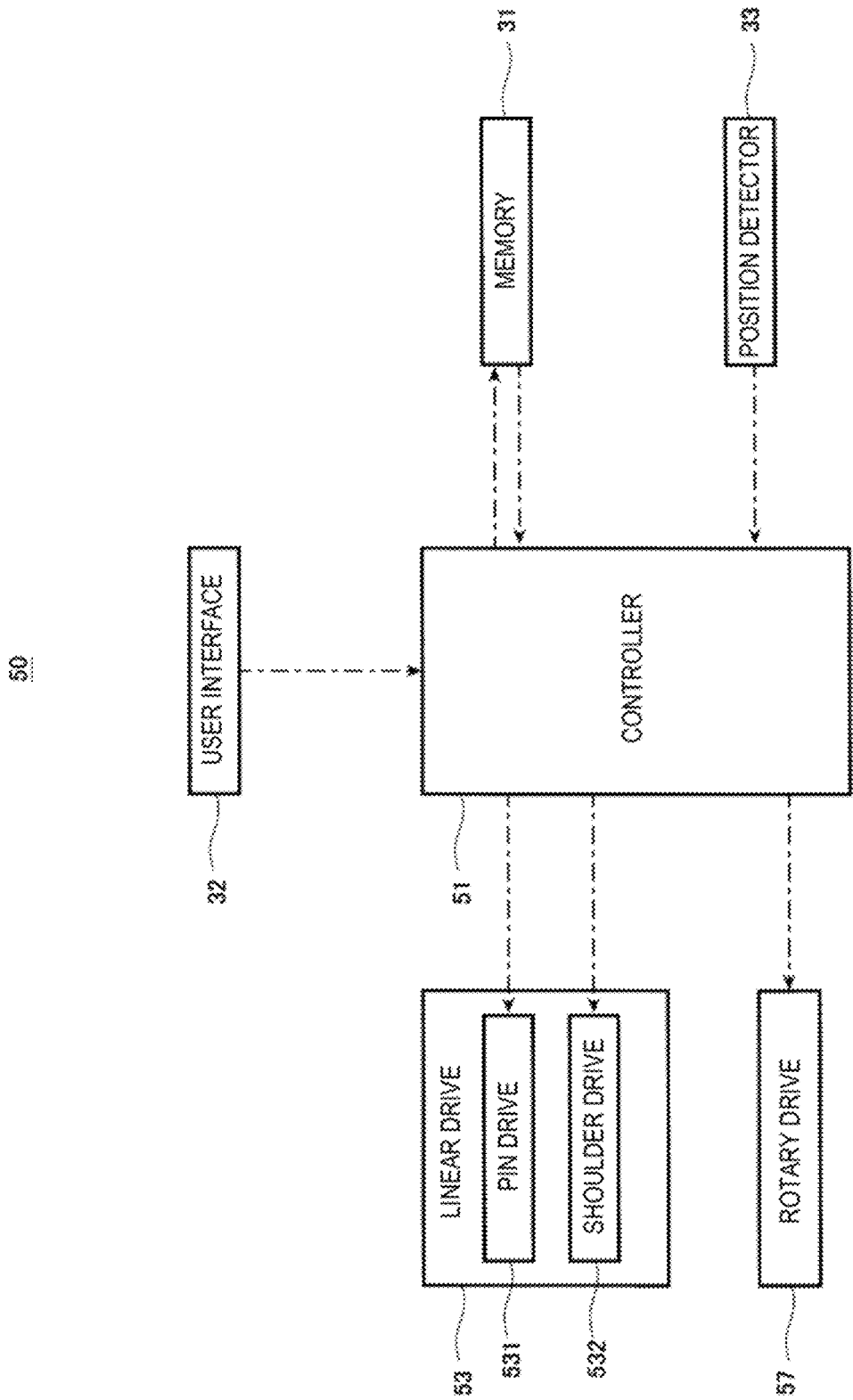
FIG. 5 is a block diagram schematically illustrating a control configuration of the friction stir spot welding apparatus illustrated in FIG. 1.

Next, a control configuration of the friction stir spot welding apparatus 50 according to Embodiment 1 is described concretely with reference to FIG. 5.

FIG. 5 is a block diagram schematically illustrating the control configuration of the friction stir spot welding apparatus illustrated in FIG. 1.

As illustrated in FIG. 5, the friction stir spot welding apparatus 50 includes a controller 51, a memory 31, a user interface 32, and a position detector 33.

The controller 51 controls each member (each apparatus) which constitutes the friction stir spot welding apparatus 50. In detail, the controller 51 controls the pin drive 531 and the shoulder drive 532 which constitute the linear drive 53, and the rotary drive 57, by reading and executing software, such as a basic program stored in the memory.

Therefore, it can control switching between an advancing movement and a retreating movement of the pin member 11 and the shoulder member 12, and tip-end positions, moving, speeds, move directions, etc. of the pin member 11 and the shoulder member 12 during the linear movement (the advancing movement and the retreating movement). Further, it can control a thrust or pressing, force of the pin member 11, the shoulder member 12, and the clamp member 13 which presses the to-be-joined object 60. Further, it can control rotational speeds of the pin member 11 and the shoulder member 12.

Note that the controller 51 may be comprised of a sole controller 51 which carries out a centralized control, or may be comprised of a plurality of controllers 51 which collaboratively carry out a distributed control. The controller 51 may be comprised of a microcomputer, or may be comprised of air MPU, a PLC (Programmable Logic Controller), a logical circuit, etc.

The memory 31 stores the basic program and various data possible so as to be read out, and it is comprised of a storage device, such as a known memory or a hard disk. The memory 31 does not need to be singular, but may be comprised of a plurality of storage devices (for example, a random-access memory and a hard disk drive). If the controller 51 etc. is comprised of the microcomputer, at least a part of the memory 31 may be constituted as an internal memory of the microcomputer, or may be constituted as an independent memory.

Note that the memory 31 may store data which is readable from devices other than the controller 51 or is writable from the controller 51 etc.

The user interface 32 enables an input of various parameters related to the control of the friction stir spot welding, or other data to the controller 51, and is comprised of known input devices, such as a keyboard, a touch panel, a button switch group, etc. In Embodiment 1, at least a welding condition of the to-be-joined object 60 (for example, data such as a thickness and a material of the to-be-joined object 60) can be inputted by the user interface 32.

The position detector 33 detects positional information on the tip-end part of the shoulder member 12 (tip-end face 12a) and outputs the detected positional information to the controller 51. As the position detector 33, an an encoder, etc. may be used, for example.

In the friction stir spot welding apparatus 50 according to Embodiment 1 configured in this way, the oil solution 70 is disposed at (applied to at least one circumferential surface among the outer circumferential surface 11c of the pin member 11, the inner circumferential surface 12b of the shoulder member 12, the outer circumferential surface 12c of the shoulder member 12, and the inner circumferential surface 13b of the clamp member 13.

Therefore, by lubricating effect of the oil solution 70, since the movement of the tool (in the linear movement direction and/or the rotational direction) is not suppressed, it can suppress that the material originated from the to-be-joined object 60 enters in (adheres to) the gap between the tools. Further, since an oil film is formed on the circumferential surface of the tool, it can suppress that the material originated from the to-be-joined object 60 enters into (adheres to) the gap between the tools. Further, since the oil film is formed on the circumferential surface of the tool, it can suppress the agglutination of the material originated from the to-be-joined object 60 to the circumferential surface of the tool.

Therefore, the friction stir spot welding apparatus 50 according to Embodiment 1 can increase the number of times the friction stir spot welding apparatus 50 continuously performs the friction stir spot welding operations as compared with the conventional friction stir spot welding apparatuses.

Embodiment 2

According to a friction stir spot welding apparatus according to Embodiment 2, in the friction stir spot welding apparatus according to Embodiment 1, a recess is formed in at least one circumferential surface among the outer circumferential surface of the pin member, the inner circumferential surface of the shoulder member, the outer circumferential surface of the shoulder member, and the inner circumferential surface of the clamp member.

Below, one example of the friction stir spot welding apparatus according to Embodiment 2 is described in detail with reference to FIGS. 6 to 8.

Configuration of Friction Stir Spot Welding Apparatus

Figure 6:
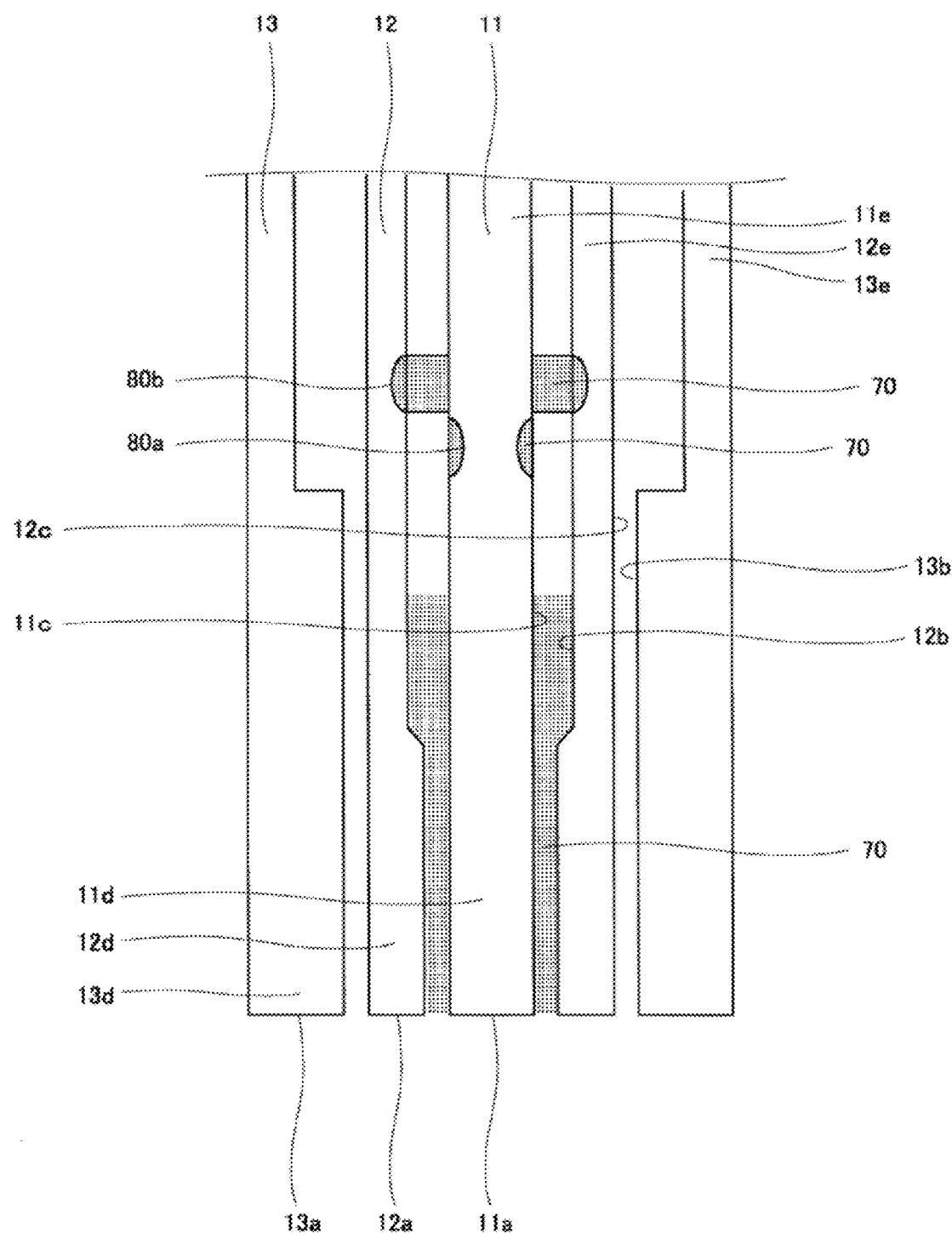
FIG. 6 is a schematic diagram illustrating an outline configuration of a substantial part of a friction stir spot welding apparatus according to Embodiment 2.
Figure 7:
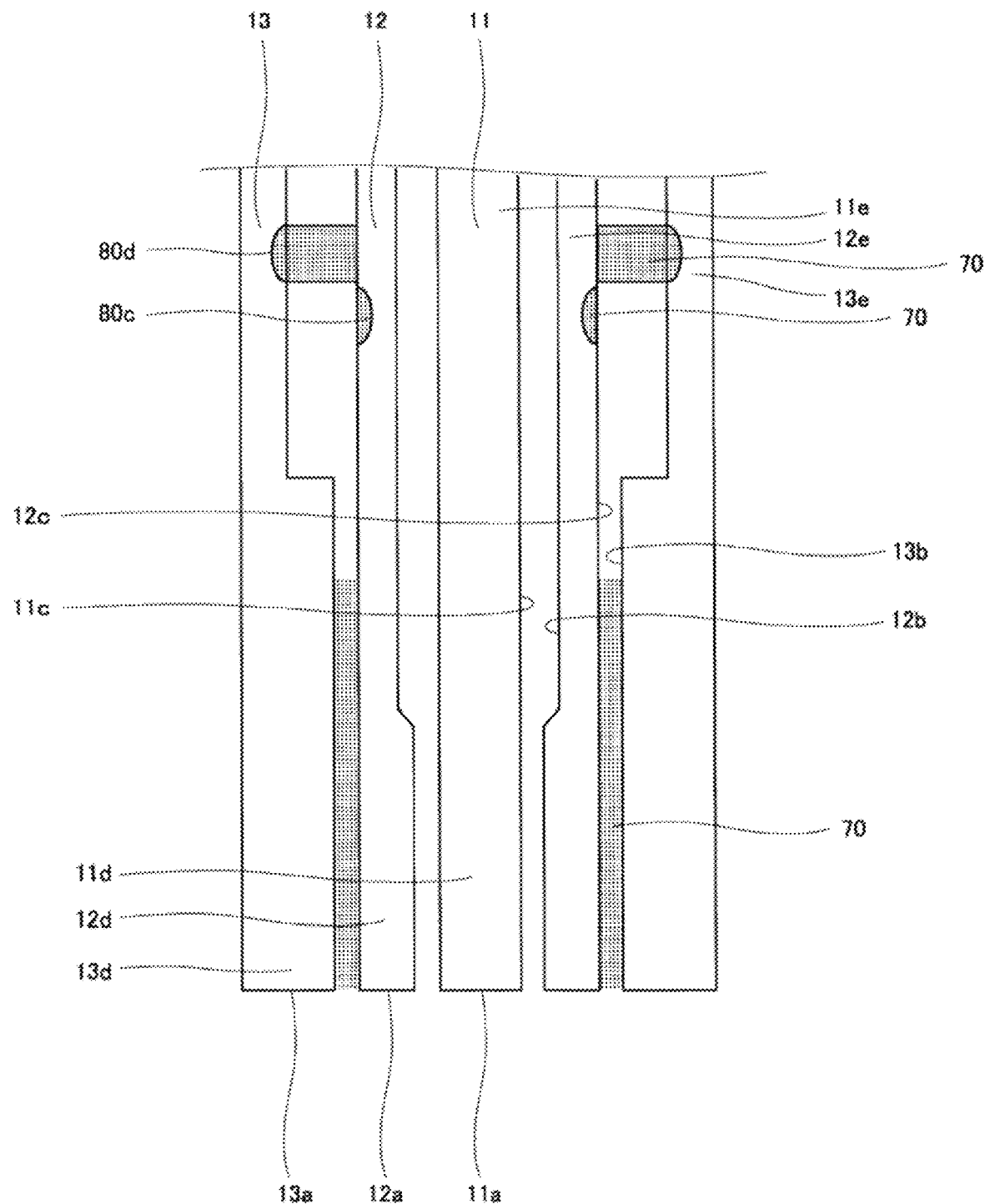
FIG. 7 is a schematic diagram illustrating the outline configuration of the substantial part of the friction stir spot welding apparatus according to Embodiment 2.
Figure 8:
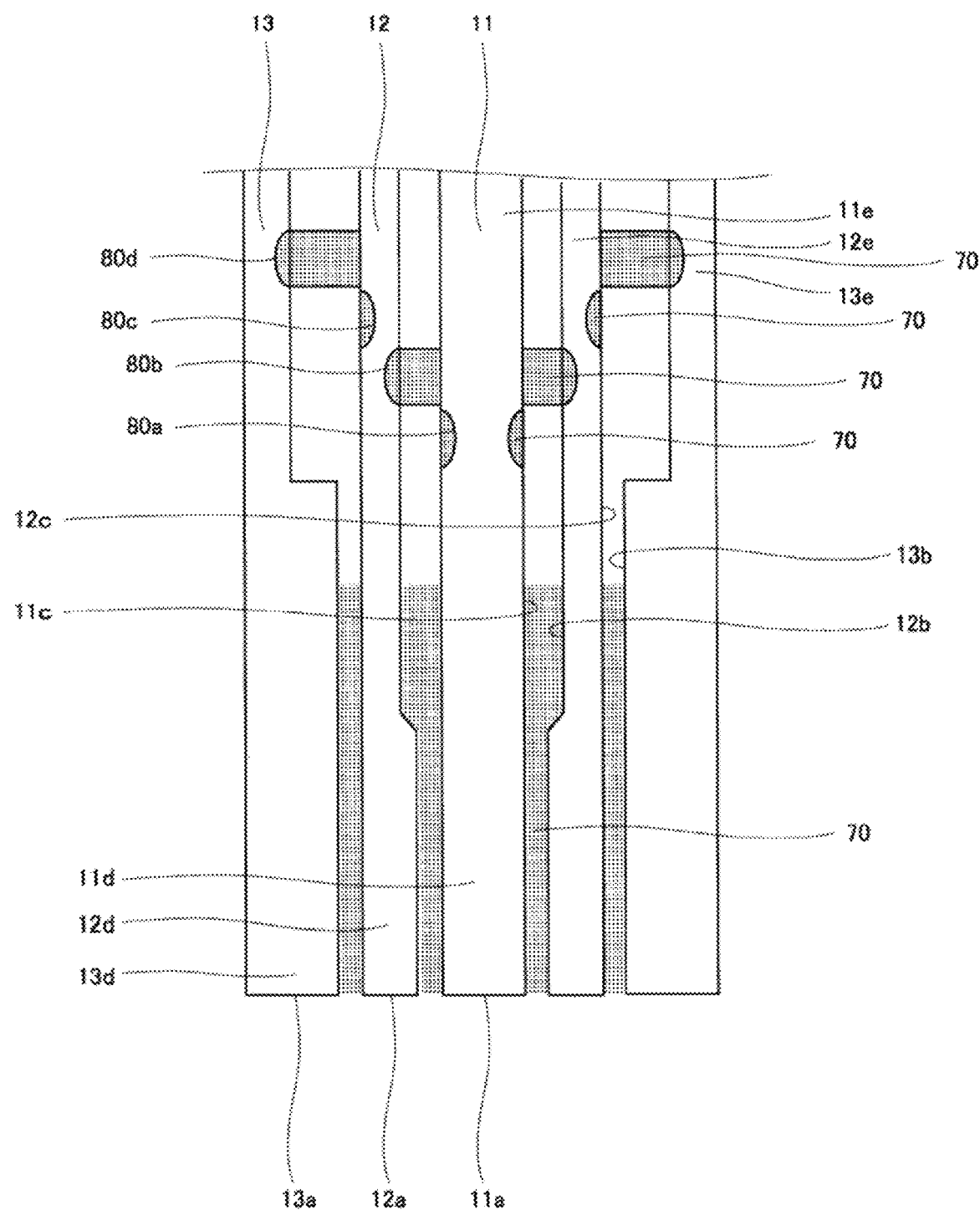
FIG. 8 is a schematic diagram illustrating the outline configuration of the substantial part of the friction stir spot welding apparatus according to Embodiment 2.

FIGS. 6 to 8 are schematic diagrams illustrating an outline configuration of a substantial part of the friction stir spot welding apparatus according to Embodiment 2.

As illustrated in FIGS. 6 to 8, although the friction stir spot welding apparatus 50 according to Embodiment 2 is the same in the fundamental configuration as the friction stir spot welding apparatus 50 according to Embodiment 1, it differs in that the recess is formed in at least one circumferential surface among the outer circumferential surface lie of the pin member 11, the inner circumferential surface 12b of the shoulder member 12, the outer circumferential surface 12c of the shoulder member 12, and the inner circumferential surface 13b of the clamp member 13.

In detail, in the friction stir spot welding apparatus 50 illustrated in FIGS. 6 and 8, a recess 80a is formed in the outer circumferential surface lie of the pin member 11, and a recess 80b is formed in the inner circumferential surface 12b of the shoulder member 12. Further, in the friction stir spot welding apparatus 50 illustrated in FIGS. 7 and 8, a recess 80c is formed in the outer circumferential surface 12c of the shoulder member 12, and a recess 80d is formed in the inner circumferential surface 13b of the clamp member 13. Note that, below, when not distinguishing between the recesses 80a-80d, each may be referred to as the recess 80.

The recess 80 may be formed in the base-end part of the tool in terms of supplying the oil solution 70 to the circumferential surface of the tip-end part of the tool. The recess 80 may have any kind of shape, as long as it is capable of holding (storing) the oil solution 70. For example, like the recess 80a and the recess 80c, the recess 80 may be comprised of a dent, or it may be comprised of a groove like the recess 80b and the recess 80d.

When the recess 80 is comprised of a groove, the groove may be formed so that it extends in the axis Xr, or it may be formed so that it extends obliquely to the axis Xr, or it may be formed in an arc shape (circular shape) along the circumference, or it may be formed in a spiral shape.

Note that, in the friction stir spot welding apparatus 50 illustrated in FIGS. 6 and 8, although the recess 80 is formed in both the circumferential surfaces of the outer circumferential surface 11c of the pin member 11 and the inner circumferential surface 12b of the shoulder member 12, the recess 80 may be formed in any one of the circumferential surfaces. Similarly, although in the friction stir spot welding apparatus 50 illustrated in FIGS. 7 and 8 the recess 80 is formed in both the circumferential surfaces of the outer circumferential surface 12c of the shoulder member 12 and the inner circumferential surface 13b of the clamp member 13, the recess 80 may be formed in any one of the circumferential surfaces. Further, a sole recess 80 may be formed in any one of the circumferential surfaces, or a plurality of recesses may be formed.

The friction stir spot welding apparatus 50 according to Embodiment 2 configured in this way also provides similar operation and effects to the friction stir spot Welding apparatus 50 according to Embodiment 1.

Further, in the friction stir spot welding apparatus 50 according to Embodiment 2, the recess 80 is formed in the circumferential surface of the tool, and the oil solution 70 is held at the recess 80. For this reason, since the oil solution 70 can be supplied to the circumferential surface of the tip-end part of the tool, the number of times the friction stir spot welding operation is performed continuously can be further increased.

Embodiment 3

In the friction stir spot welding apparatus according to Embodiment 1 or 2, a friction stir spot welding apparatus according to Embodiment 3 is further provided with an oil solution feed mechanism which supplies the oil solution to the circumferential surface.

The friction stir spot welding apparatus according to Embodiment 3 may further be provided with a controller. The controller may supply the oil solution to the circumferential surface by the oil solution feed mechanism, when the number of friction stir spot welding operations becomes above a given first number-of-times set beforehand.

Below, one example of the friction stir spot welding apparatus according to Embodiment 3 is described in detail with reference to FIGS. 9 to 11.

Configuration of Friction Stir Spot Welding Apparatus

Figure 9:
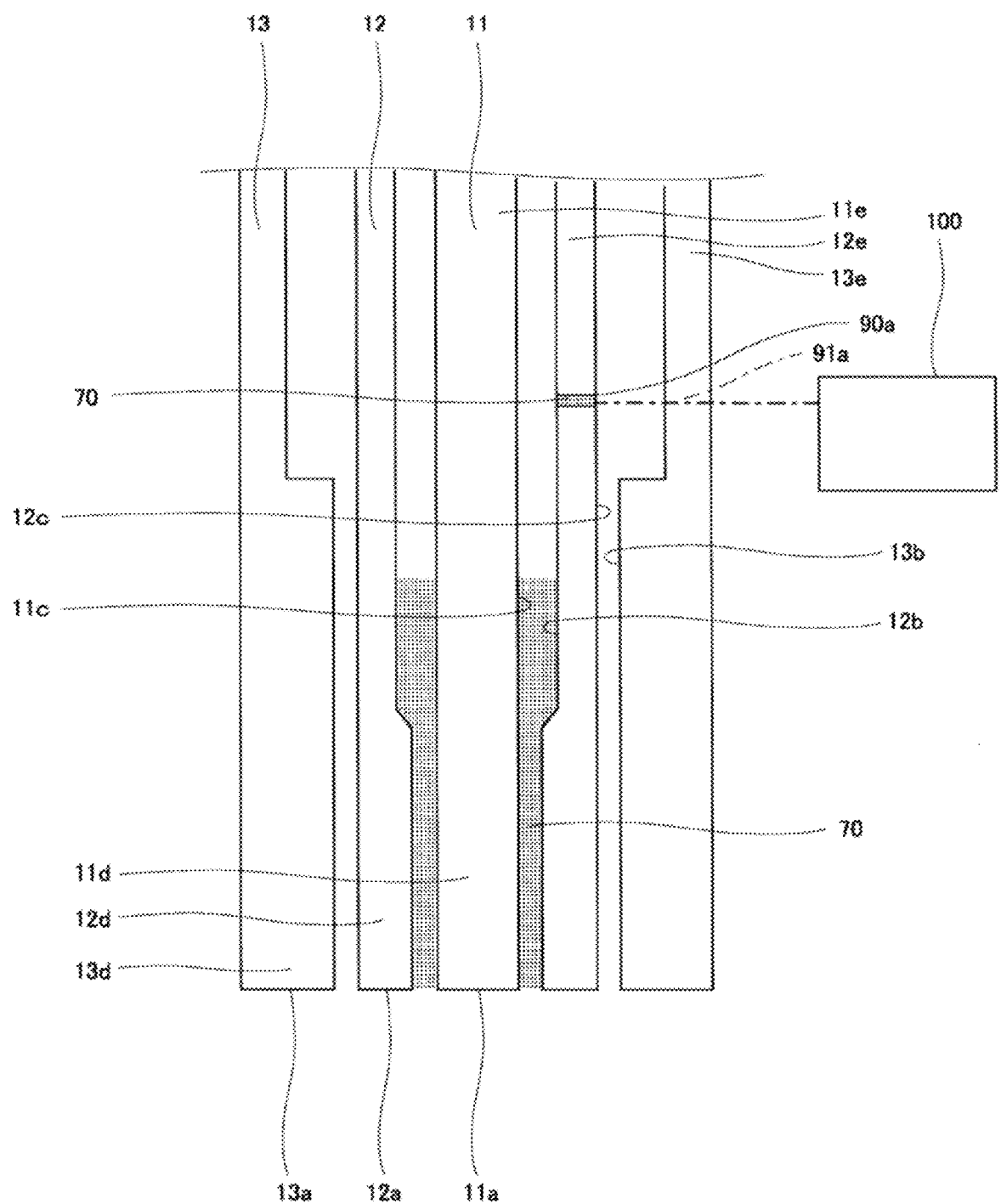
FIG. 9 is a schematic diagram illustrating an outline configuration of a substantial part of a friction stir spot welding apparatus according to Embodiment 3.
Figure 10:
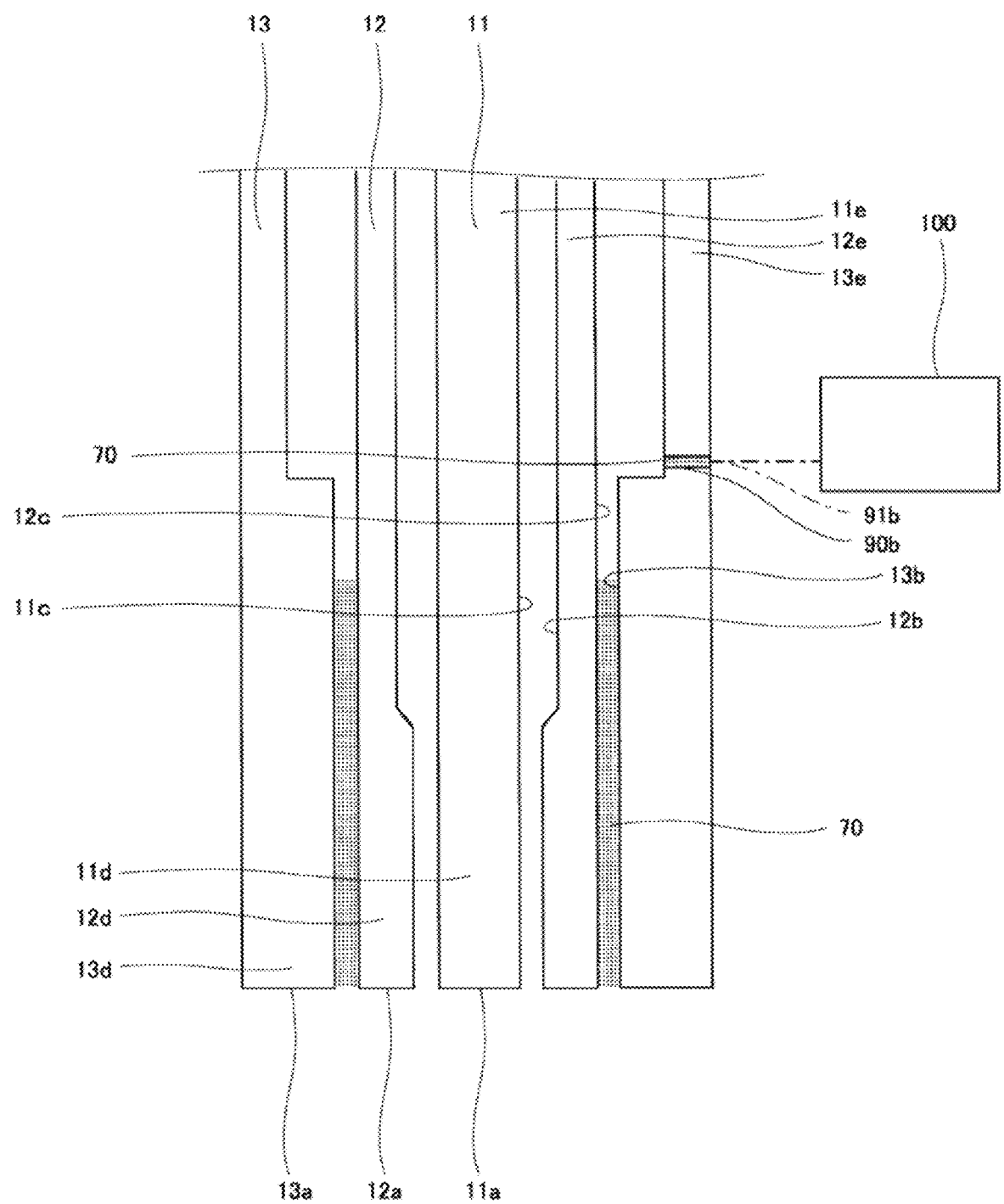
FIG. 10 is a schematic diagram illustrating the outline configuration of the substantial part of the friction stir spot welding apparatus according to Embodiment 3.
Figure 11:
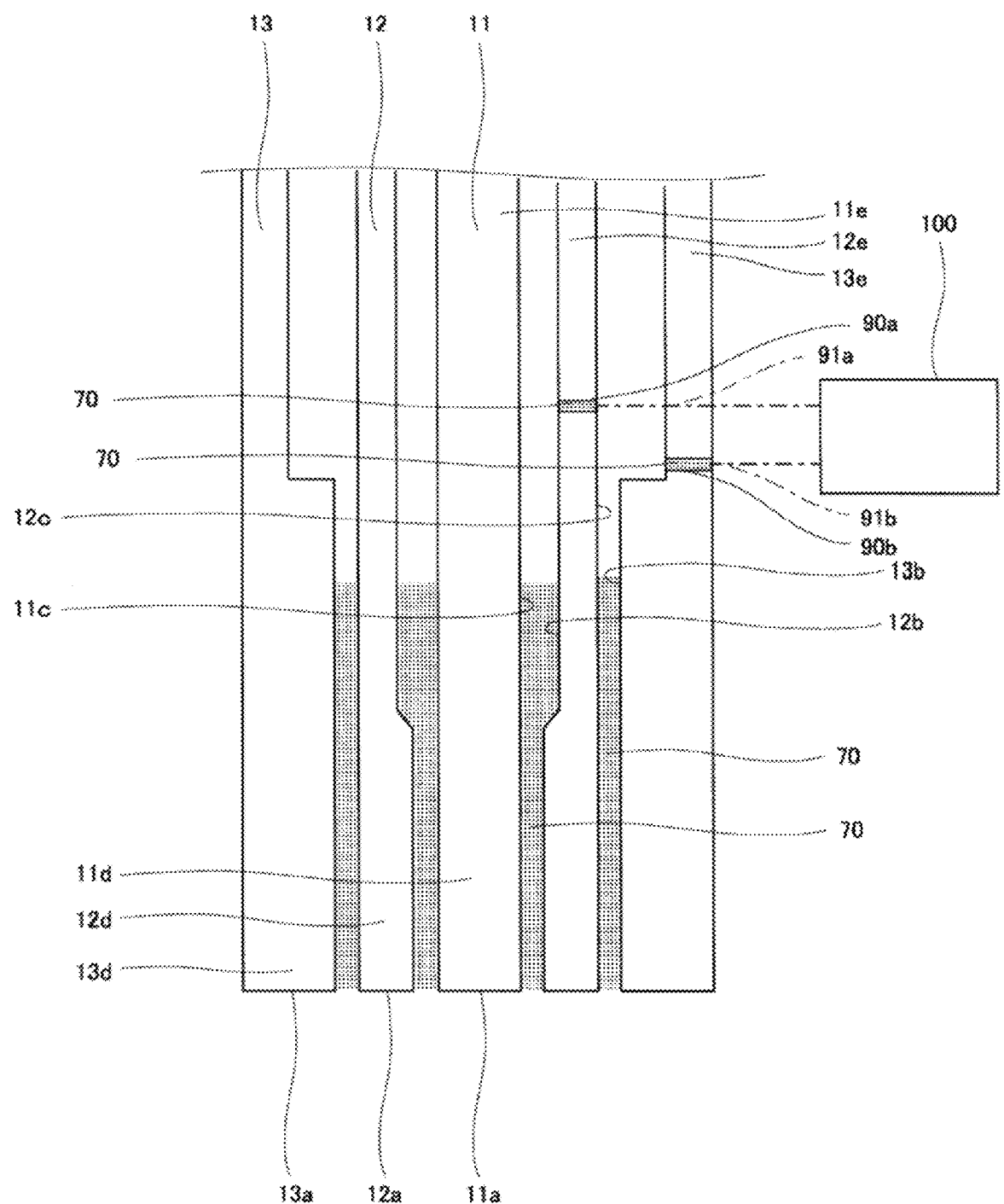
FIG. 11 is a schematic diagram illustrating the outline configuration of the substantial part of the friction stir spot welding apparatus according to Embodiment 3.

FIGS. 9 to 11 are schematic diagrams illustrating an outline configuration of a substantial part of the friction stir spot welding apparatus according to Embodiment 3.

As illustrated in FIGS. 9 to 11, the friction stir spot welding apparatus 50 according to Embodiment 3 is the same in the fundamental configuration as the friction stir spot welding apparatus 50 according to Embodiment 1, but it differs in that it is further provided with the oil solution feed mechanism 100.

The oil solution feed mechanism 100 may have any configuration, as long as it is capable of supplying the oil solution 70 to the friction stir spot welding apparatus 50, and, for example, it may be comprised of a container which stores the oil solution 70, and a pump (piston) which sends out the oil solution 70 inside the container.

The oil solution feed mechanism 100 may be comprised of the container which stores the oil solution 70, and the robot which holds the friction stir spot welding apparatus 50 in a state where the tip-end part of the pin member 11 and/or the shoulder member 12 projects more than the tip-end part of the clamp member 13, and causes the tip-end part of the pin member 11 and/or the shoulder member 12 to enter into the container. Note that the robot may remove the pin member 11 and/or the shoulder member 12 from the friction stir spot welding apparatus 50 and hold the member.

Alternatively, the oil solution feed mechanism 100 may be comprised of a brush, a swab, etc. to which the oil solution 70 is adhered. In this case, in a case where the tip-end part of the pin member 11 and/or the shoulder member 12 projects more than the tip-end part of the clamp member 13, the robot may hold the friction stir spot welding apparatus 50 and bring the tip-end part of the pin member 11 and or the shoulder member 12 in contact with the brush etc. to supply the oil solution 70 to the circumferential surface of the tool.

Further, the oil solution feed mechanism 100 may dispose the oil solution 70 on the upper surface of the to-be-joined object 60 (the surface which contacts the tool). In this case, when the friction stir spot welding apparatus 50 carries out the friction stir spot welding at a part of the to-be-joined object 60 where the oil solution 70 is disposed, the oil solution 70 is supplied to the circumferential surface of the tool.

Note that cloth etc. may be held by a worker or a robot, and the oil solution 70 adhered to the tip-end face of the tool may be removed.

In the friction stir spot welding apparatus 50 illustrated in FIGS. 9 and 11, a through-hole 90a is formed in the circumferential surface of the base-end part 12e of the shoulder member 12. The through-hole 90a is connected to the oil solution feed mechanism 100 via a passage 91a. Therefore, the oil solution 70 can be supplied from the oil solution feed mechanism 100 to the outer circumferential surface 11c of the pin member 11 and/or the inner circumferential surface 12b of the shoulder member 12 via the through-hole 90a.

Note that the passage 91a is comprised of suitable piping etc. and does not always need to be disposed at the friction stir spot welding apparatus 50. When supplying the oil solution 70 from the oil solution feed mechanism 100, the passage 91a may connect the oil solution feed mechanism 100 to the through-hole 90a.

Further, in the friction stir spot welding apparatus 50 illustrated in FIGS. 10 and 11, a through-hole 90b is formed in the circumferential surface of the clamp member 13. The through-hole 90b is connected with the oil solution feed mechanism 100 via a passage 91b. Therefore, the oil solution 70 can be supplied from the oil solution feed mechanism 100 to the outer circumferential surface 12c of the shoulder member 12 and/or the inner circumferential surface 13b of the clamp member 13 via the through-hole 90b.

Note that the passage 91b is comprised of suitable piping etc. and docs not always need to be disposed at the friction stir spot welding apparatus 50. When supplying the oil solution 70 from the oil solution feed mechanism 100, the passage 91b may connect the oil solution feed mechanism 100 to the through-hole 90b.

In FIG. 11, although the through-hole 90a and the through-hole 90b are disposed so as not to overlap with each other when seen horizontally, it is not limited to this configuration, and it may be disposed so as to overlap with each other.

Operation and Effects of Friction Stir Spot Welding Apparatus

Figure 12:
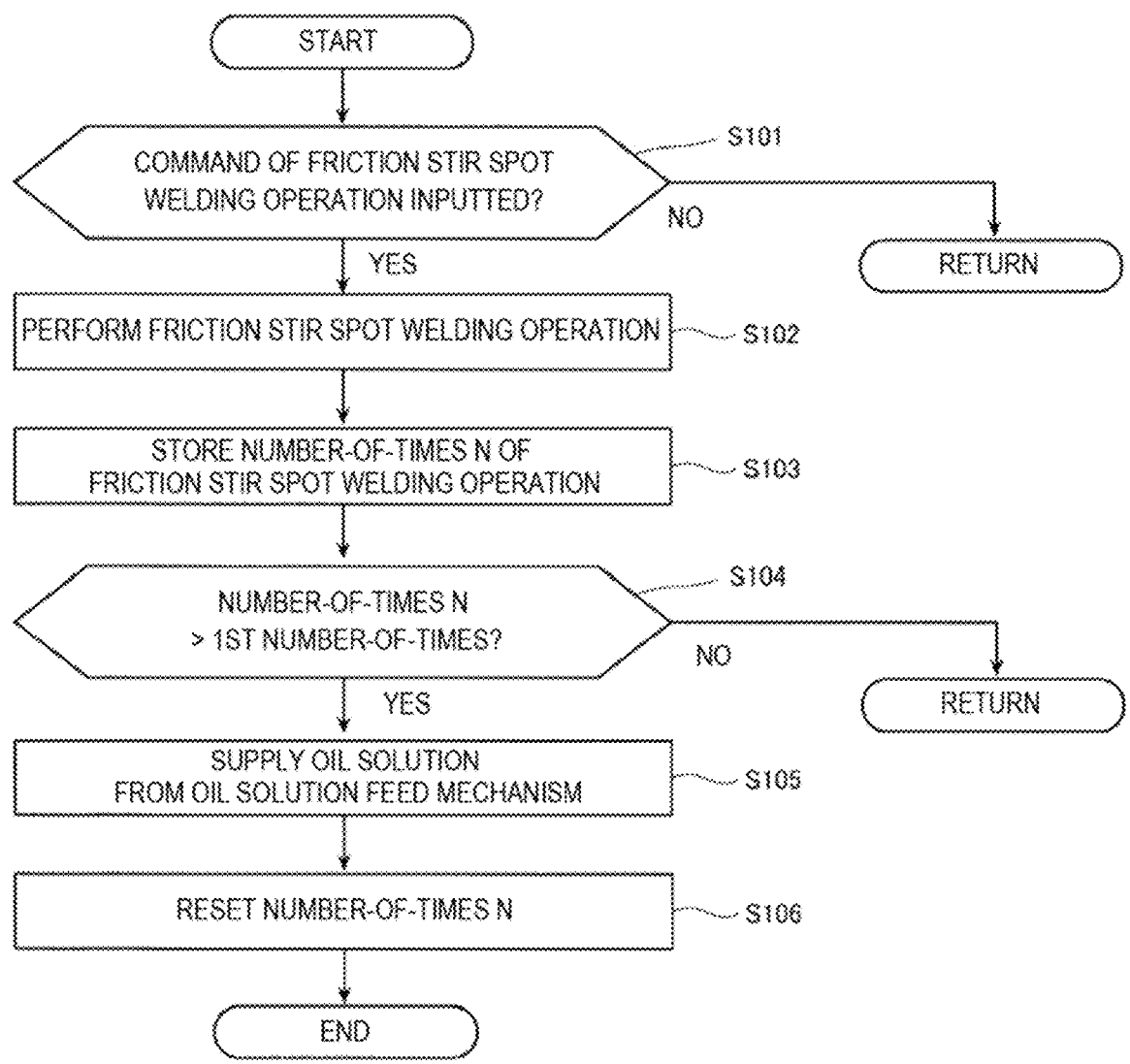
FIG. 12 is a flowchart illustrating one example of operation of the friction stir spot welding apparatus according to Embodiment 3.

Next, operation of the friction stir spot welding apparatus 50 according to Embodiment 3 is described concretely with reference to FIG. 12. Note that the following operation is performed by the controller 51 reading the program stored in the memory 31.

FIG. 12 is a flowchart illustrating one example of operation of the friction stir spot welding apparatus according to Embodiment 3.

As illustrated in FIG. 12, the controller 51 determines whether an execution command of the friction stir spot welding operation for the to-be-joined object 60 is inputted by the worker operating the user interface 32 (Step S101).

If the controller 51 determines that the execution command of the friction stir spot welding operation is not inputted (No at Step S101), it executes the processing at Step S101 again, for example, after 50 msec. On the other hand, when the controller 51 determines that the execution command of the friction stir spot welding operation is inputted (Yes at Step S101), it executes processing at Step S102.

At Step S101, the controller 51 causes the friction stir spot welding apparatus 50 to perform the friction stir spot welding operation for the to-be-joined object 60. Note that, since the friction stir spot welding operation by the friction stir spot welding apparatus 50 is performed similarly to known friction stir spot welding operations, the detailed explanation is omitted.

Next, the controller 51 stores a number-of-times N of the friction stir spot welding operation in the memory 31 (Step S103). In detail, for example, the controller 51 acquires a number-of-times $N_k$ stored in the memory 31. Subsequently, each time the controller 51 performs the friction stir spot welding operation once (joining a single joined part), it adds the number of times for one time to the number-of-times $N_k$, and stores it in the memory 31 as the number-of-times $N_{k+1}$.

Next, the controller 51 determines whether the number-of-times N stored at Step S03 is above the given first number-of-times set beforehand (Step S104). Here, the first number-of-tunes can be set beforehand by an experiment etc. For example, in terms of maintaining the state where the oil film is formed on the circumferential surface of the tool, the first number-of-times may be 100 times, may be 150 times, or may be 200 times, when the liquid oil solution 70 is used. Further, for example, in terms of maintaining the state where the oil film is formed on the circumferential surface of the tool, the first number-of-times may be 1,000 times, may be 1,500 times, or may be 2,000 times, when the semisolid oil solution 70 is used.

If the controller 51 determines that the number-of-times N stored at Step S103 is below the first number-of-times (No at Step S104), it ends the program, and executes the processing at Step S101 again, for example, after 50 msec. On the other hand, if the controller 51 determines that the number-of-times N stored at Step S103 is above the first number-of-times (Yes at Step S104), it executes processing at Step S105.

At Step S105, the controller 51 supplies the oil solution 70 from the oil solution feed mechanism 100 to the friction stir spot welding apparatus 50. Subsequently, the controller 51 resets the number-of-times N stored in the memory 31 (sets the number-of-times $N_{k+1}$ to 0; Step S106), and ends this program.

The friction stir spot welding apparatus 50 according to starting Embodiment 3 configured in this way also provides similar operation and effects to the friction stir spot welding apparatus 50 according to Embodiment 1.

Note that, in the friction stir spot welding apparatus 50 according to Embodiment 3, although the controller 51 supplies the oil solution 70 from the oil solution feed mechanism 100 to the friction stir spot welding apparatus 50 when it becomes above the first number of times, the friction stir spot welding apparatus 50 is not limited to this configuration.

For example, after the maintenance of the friction stir spot welding apparatus 50 is performed, the controller 51 may supply the oil solution 70 from the oil solution feed mechanism 100 to the friction stir spot welding apparatus 50. Alternatively, the controller 51 may supply the oil solution 70 from the oil solution feed mechanism 100 to the friction stir spot welding apparatus 50, before the friction stir spot welding apparatus 50 performs the friction stir spot welding operation (after determined that the execution command of the friction stir spot welding operation is inputted at Step S101).

Further, although in the friction stir spot welding apparatus 50 according to Embodiment 3 the configuration of the friction stir spot welding apparatus 50 according to Embodiment 1 is adopted, the friction stir spot welding apparatus 50 according to Embodiment 2 may be adopted.

EXAMINATION EXAMPLES

Next, examination examples of the friction stir spot welding apparatus 50 according to Embodiment 1 are described.

Examination Example 1

In Examination Example 1, the to-be-joined object 60 was continuously joined using the friction stir spot welding apparatus 50 (see FIG. 2) where the oil solution 70 is disposed at the outer circumferential surface 11c of the pin member 11 and the inner circumferential surface 12b of the shoulder member 12.

Note that the Moly Paste S (brand name) was used as the oil solution 70, and before continuously joining the to-be-joined object 60, the oil solution 70 was applied to the outer circumferential surface 11c of the pin member H and the inner circumferential surface 12b of the shoulder member 12. Further, below, the number of times the to-be-joined object 60 is joined may be referred to as "the number of welding points."

Examination Example 2

In Examination Example 2, similarly to Examination Example 1, the to-be-joined object 60 was continuously joined using the friction stir spot welding apparatus 50 see FIG. 2) where the oil solution 70 is disposed at the outer circumferential surface 11c of the pin member 11 and the inner circumferential surface 12b of the shoulder member 12. SUMIKO Hightemp Oil G (brand name) was used as the oil solution 70, and the oil solution 70 was supplied for every 112 welding points. A worker performed the supply of the oil solution 70 by bringing a swab to which the oil solution 70 is adhered in contact with the inner circumferential surface 12b of the shoulder member 12.

Comparative Example

In a comparative example, the to-be-joined object 60 was continuously joined using the conventional friction stir spot welding apparatus where the oil solution 70 is not disposed at the tool.

Test Results

Aluminum alloy plates (A6061) with a thickness of 1.0 mm were used as the first member 61 and the second member 62 which are the to-be-joined object 60. The friction stir spot welding was continuously performed by the friction stir spot welding apparatuses 50 of Examination Example 1, Examination Example 2, and the comparative example, and a current value of the motor which constitutes the pin drive was detected.

Figure 13:
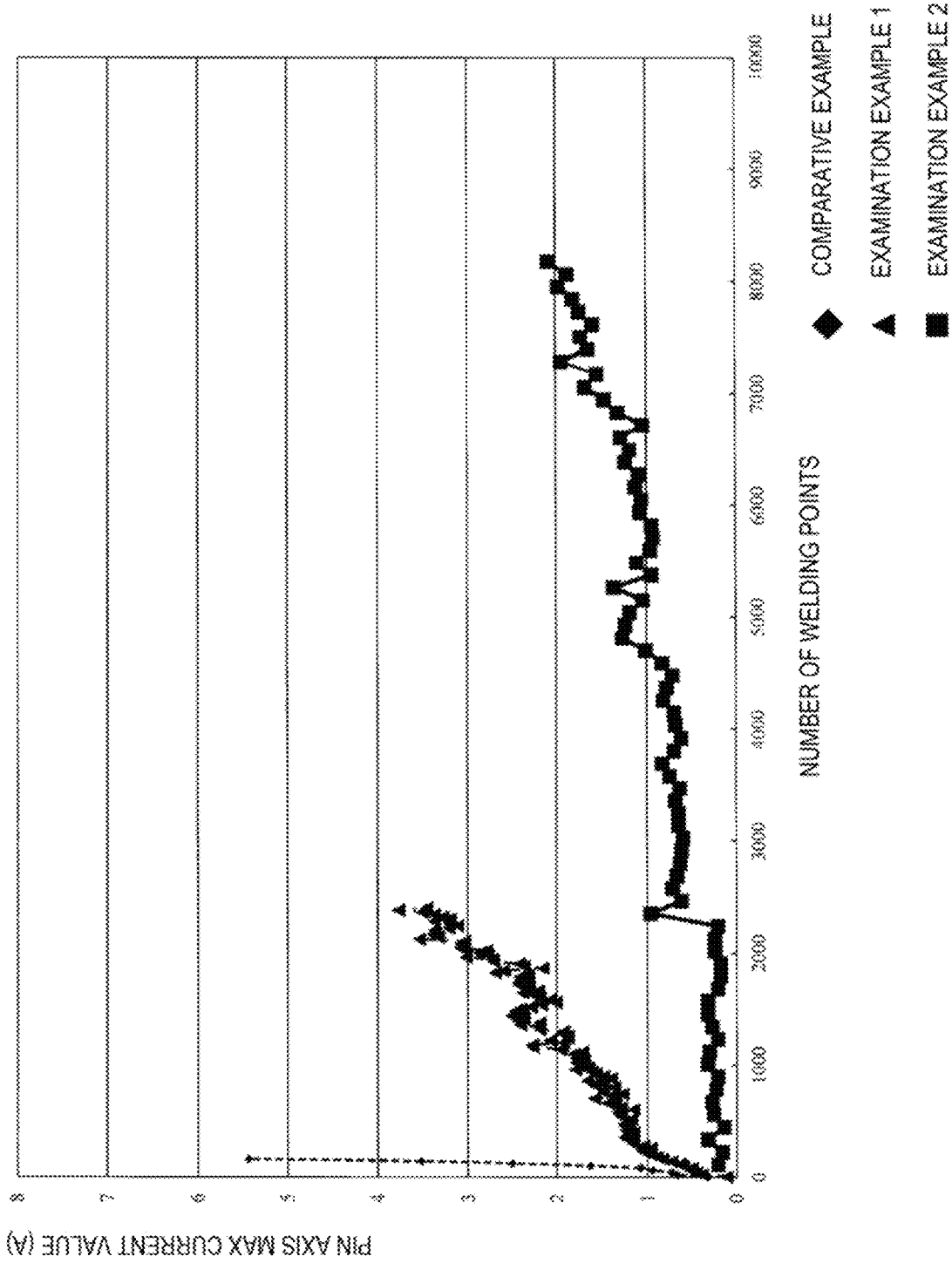
FIG. 13 is a graph illustrating a change in a current value of a motor which constitutes a pin drive over the number of welding points.

FIG. 13 is a graph illustrating a change in the current value of the motor which constitutes the pin drive, over the number of welding points. In FIG. 13, the horizontal axis indicates the number of welding points which is the number of times the friction stir spot welding apparatus 50 joined the to-be-joined part of the to-be-joined object 60. Moreover, in FIG. 13, the vertical axis indicates the maximum current value of the motor when the tip end of the pin part 11 is retreated with respect to the tip end of the shoulder member 12, at each welding point (hereinafter, referred to as "the pin axis max current value").

Further, in FIG. 13, the diamond (broken line) indicates the pin axis maximum current value at each welding point when continuously joined using the friction stir spot welding apparatus 50 of the comparative example. The triangle (one-dot chain line) indicates the pin axis maximum current value at each welding point when continuously joined using the friction stir spot welding apparatus 50 of Examination Example 1, and the square (solid line) indicates the pin axis maximum current value at each welding point when continuously joined using the friction stir spot welding apparatus 50 of Examination Example 2.

As illustrated in FIG. 13, when continuously joined using the friction stir spot welding apparatus 50 of the comparative example, it was found that the pin axis maximum current value rises rapidly. This is because, as a result of the material originated from the to-be-joined object 60 being agglutinated to the outer circumferential surface 11c of the pin member 11 and/or the inner circumferential surface 12b of the shoulder member 12, the torque for linearly moving the pin member 11 is increased, and therefore, the value of current which flows through the pin drive 531 is increased.

On the other hand, when continuously joined using the friction stir spot welding apparatus 50 of Examination Example 1, it was found that the pin axis maximum current value is able to maintain a low current value (about 3 A), even when exceeding 2,000 welding points. Further, when continuously joined using the friction stir spot welding apparatus 50 of Examination Example 2, it was found that the pin axis maximum current value is able to maintain the low current value (about 3 A), even when exceeding 8,000 welding points.

Thus, it was found that, when the oil solution 70 is disposed at the outer circumferential surface 11c of the pin member 11 and the inner circumferential surface 12b of the shoulder member 12, the agglutination of the material originated from the to-be-joined object 60 to the circumferential surfaces is suppressed (not illustrated), and, as a result, the number of times the friction stir spot welding operation is continuously performed can be increased as compared with the conventional friction stir spot welding apparatuses.

Moreover, from the result of Examination Example 2, it was found that the number of times the friction stir spot welding operation is continuously performed can be increased more by supplying the oil solution 70 to the circumferential surface of the tool at every given numbers of welding points first number-of-times). For this reason, it was suggested that, by maintaining the state where the oil solution 70 is disposed at the circumferential surface of the tool, the number of times the friction stir spot welding operation is continuously performed can be increased more.

Further, in Examination Example 2, the pin axis maximum current value was about 0.1 A to 0.3 A until it exceeding 2,000 welding points, while it increased rapidly to 0.6 A to 1 A after it exceeding 2,000 welding points. Therefore, the present inventors consider that the rapid increase in the pin axis maximum current value can be suppressed by performing cleaning of the tool (removal of the material agglutinated to the tool) when exceeding 2,000 welding points.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. Details of the structure and or the function may be altered substantially without departing from the present disclosure. Various inventions may be formed by a suitable combination of a plurality of components disclosed in the above embodiments.

INDUSTRIAL APPLICABILITY

The friction stir spot welding apparatus and the method of operating the double-acting friction stir spot welding apparatus of the present disclosure are useful because they are capable of suppressing the agglutination of the material originated from the to-be-joined object at the circumferential surface of the tool, as compared with the conventional friction stir spot welding apparatuses.

What is claimed is:
1. A double-acting friction stir spot welding apparatus, comprising:
    a pin formed in a cylindrical shape;
    a shoulder formed in a hollow cylindrical shape and into which the pin is inserted;
    a clamp formed in a hollow cylindrical shape and into which the shoulder is inserted;
    a rotary drive that rotates the pin and the shoulder on an axis coaxial with the pin; and
    a linear drive that reciprocates each of the pin and the shoulder along the axis,
    wherein an oil solution is disposed at at least one circumferential surface out of an outer circumferential surface of the pin and an inner circumferential surface of the shoulder.
2. The double-acting friction stir spot welding apparatus of claim 1, wherein a recess is formed in at least one circumferential surface among the outer circumferential surface of the pin, the inner circumferential surface of the shoulder, the outer circumferential surface of the shoulder, and an inner circumferential surface of the clamp.
3. The double-acting friction stir spot welding apparatus of claim 1, wherein the oil solution is liquid or semisolid.
4. The double-acting friction stir spot welding apparatus of claim 1, further comprising an oil solution feeder that supplies the oil solution to the at least one circumferential surface.
5. The double-acting friction stir spot welding apparatus of claim 4, further comprising a controller,
    wherein the controller supplies the oil solution to the circumferential surface by the oil solution feeder, when a number of friction stir spot welding operations is greater than a predetermined number.
6. A method of operating a double-acting friction stir spot welding apparatus, the double-acting friction stir spot welding apparatus comprising:
    a pin formed in a cylindrical shape;
    a shoulder formed in a hollow cylindrical shape and into which the pin is inserted;
    a clamp formed in a hollow cylindrical shape and into which the shoulder is inserted;

a rotary drive that rotates the pin and the shoulder on an axis coaxial with the pin; and a linear drive that reciprocates each of the pin and the shoulder along the axis, the method comprising:

(A) supplying an oil solution to at least one circumferential surface out of an outer circumferential surface of the pin and an inner circumferential surface of the shoulder.

7. The method of claim 6, wherein the double-acting friction stir spot welding apparatus further includes an oil solution feeder, and wherein the (A) includes supplying the oil solution to the at least one circumferential surface by the oil solution feeder.

8. The method of claim 7, wherein the (A) includes supplying the oil solution to the circumferential surface by the oil solution feeder, when a number of friction stir spot welding operations is greater than a predetermined number.

9. The method of claim 7, wherein the (A) includes supplying the oil solution to the circumferential surface by the oil solution feeder, before performing a friction stir spot welding operation, and/or after performing the friction stir spot welding operation.

10. The method of claim 6, wherein a recess is formed in at least one circumferential surface out of the outer circumferential surface of the pin and the inner circumferential surface of the shoulder.

11. The method of claim 6, wherein the oil solution is liquid or semisolid.

* * * * *